United States Patent Office 3,133,114
Patented May 12, 1964

3,133,114
PREPARATION OF NITRILES
Benjamin T. Freure and Harry J. Decker, Charleston, W. Va., assignors to Union Carbide Corporation, a corporation of New York
No Drawing. Filed Aug. 17, 1960, Ser. No. 50,078
10 Claims. (Cl. 260—465.4)

The present invention relates to the production of nitriles through the reaction of alkali metal cyanides with organic halides in the presence of an improved reaction medium.

In the past, nitriles have been produced by the reaction of metallic cyanides with organic halides in various solvent media. The yield, efficiency, reaction rate, product purity, and ease of separation of the product nitrile was directly dependent upon the choice of solvent medium. In attempts to increase the foregoing reaction properties, various solvents have been proposed. Alcohols and ether alcohols have been used effectively as solvent media but extraction of the product nitriles is hampered by resultant by-product tars and ethers which are inherent in the reaction.

It is an object of the present invention to provide a method for carrying out the production of nitriles by the reaction of an alkali metal cyanide with an organic halide in a reaction medium which will permit a high speed of reaction, high yields, and be adaptable to the production of a wide range of nitriles of high purity.

Another object is to provide a reaction medium for the aforementioned reaction which will facilitate recovery of the product nitrile from the reaction products and which will remain stable under the reaction conditions.

A further object of the invention is to provide a reaction medium for said reaction which will have no adverse effect on the product nitrile if a small amount is allowed to remain in it during recovery.

The aforementioned objects may be attained in accordance with the present invention by reacting an alkali metal cyanide with a halogen substituted aliphatic compound, wherein at least one halogen atom of atomic weight greater than 35 is linked to a non-tertiary carbon atom, in a solvent medium which is a member of the group consisting of 1-acetylmorpholine, 1,3-dimethyl-2-imidazolidinone, and compounds of the general formula:

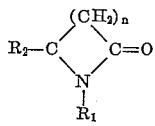

wherein $n$ represents an integer which is a member of the group consisting of 2 and 3, and $R_1$ and $R_2$ represent members of the group consisting of hydrogen, methyl, ethyl, isopropyl and propyl.

One method of practicing the present invention comprises first forming in a reaction vessel a slurry of an alkali metal cyanide, such as sodium cyanide, lithium cyanide, or potassium cyanide, in a solvent which is a member of the group consisting of 1-acetylmorpholine, 1,3-dimethyl-2-imidazolidinone, 2-pyrrolidone, 5-methyl-2-pyrrolidone, 5-ethyl-2-pyrrolidone, 5-propyl-2-pyrrolidone, 1-methyl-2-pyrrolidone, 1-ethyl-2-pyrrolidone, 1-propyl-2-pyrrolidone, 1,5-dimethyl-2-pyrrolidone, 5-ethyl-1-methyl-2-pyrrolidone, 1-methyl-5-propyl-2-pyrrolidone, 1-ethyl-5-methyl-2-pyrrolidone, 5-methyl-1-propyl-2-pyrrolidone, 1,5 - diethyl - 2-pyrrolidone, 1-ethyl-5-propyl-2-pyrrolidone, 5-ethyl-1-propyl-2-pyrrolidone, 2-piperidone, 6 - methyl-2-piperidone, 6-ethyl-2-piperidone, 6-propyl-2-piperidone, 1-methyl-2-piperidone, 1-ethyl-2-piperidone, 1-propyl-2-piperidone, 1,6-dimethyl-2 piperidone, 6-ethyl-1-methyl-2-piperidone, 1-methyl-6-propyl-2-piperidone, 1-ethyl-6-methyl-2-piperidone, 6-methyl-1-propyl-2-piperidone, 1,6-diethyl-2-piperidone, 1-ethyl-6-propyl-2-piperidone, and 6-ethyl-1-propyl-2-piperidone. These solvents may be diluted to an extent no greater than 75 percent, but it is preferred to use them without dilution. The temperature of the slurry is maintained at about 100° C. to 200° C. and a halogen substituted compound, wherein at least one halogen atom of atomic weight greater than 35 is linked to a non-tertiary carbon atom, is added to the slurry over a period of from 10 to 240 minutes.

The order and rate of addition are not critical, and the rate of addition will depend on the thermal control of the reaction system. At high rates of addition, cooling may be required to control the reaction, and at slow rates of addition, heating may be required to maintain the reaction temperature. When the addition of this halogenated compound is complete, the reaction mixture is stirred while a temperature of from 100° C. to 200° C. (140° C. to 160° C. preferred) is maintained for a period of from 1 to 4 hours. The mixture is then cooled and filtered. The filter cake is washed with ethyl ether and the nitrile is purified by distillation of the filtrate. Any nitrile remaining in the filter cake may also be recovered by dissolving the filter cake in water and decanting the nitrile layer.

The choice of halogen substituted aliphatic compound is determined by the product nitrile desired. In addition to the halogens, chloride, bromide and iodide, other functional groups may be present so long as they do not react with the alkali metal cyanide or the solvent. These groups include nitrile, carboxyl, hydroxyl, ester, ether and ketone.

The invention is particularly adapted to the preparation of the lower alkyl esters of 6-cyanohexanoic acid by reacting the alkali metal cyanide with a lower alkyl ester of 6-chlorohexanoic acid, such as the methyl, ethyl, isopropyl, n-propyl, n-butyl, isobutyl, amyl and hexyl esters. The resulting nitriles may be hydrogenated to 7-aminoheptanoic esters which are valuable intermediates for forming nylon-7 polymers. The process of this invention permits the production of these intermediates in the high purity required for condensation reactions to high polymers. Also, the invention is versatile in that any desired alkyl chloride can be converted to the corresponding nitrile. For example, 1,4-dichlorobutane can be converted to adiponitrile, which is the intermediate for the diacid and diamine required for nylon-66 polymers.

The examples to follow will illustrate several methods of practicing the invention, all parts given being by weight:

EXAMPLE 1

1,6-Dimethyl-2-Piperidone ($n$=3, $R_1$=CH$_3$, $R_2$=CH$_3$)

A slurry of 66 parts of 96 percent sodium cyanide and 215 parts of 1,6-dimethyl-2-piperidone was heated and stirred at 150° C. while 215 parts of ethyl 6-chlorohexanoate were added over a period of 25 minutes. The temperature were held at 145° C.–150° C. for three hours after completion of the feed. The mixture was then cooled, filtered, and the filter cake washed with ethyl ether. Distillation of the filtrate afforded an 85 percent yield of ethyl 6-cyanohexanoate at 99 percent efficiency. Solvent recovery was quantitative.

EXAMPLE 2

1-Acetylmorpholine

A slurry of 58 parts of 96 percent sodium cyanide and 200 parts of 1-acetylmorpholine was heated and stirred at 160° C. while 200 parts of ethyl 6-chlorohexanoate were added to the slurry over a period of 20 minutes. Heating was continued for four hours after the chloro ester was added to complete the reaction. After a filtering and extraction of the filter cake with ethyl ether, the filtrate and washings were extracted with water to remove the acetylmorpholine, which boils very close to the cyano ester. Fractionation of the oil layer obtained after the water extraction afforded ethyl 6-cyanohexanoate in 58 percent yield at 98 percent efficiency.

EXAMPLE 3

1-Ethyl-6-Methyl-2-Piperidone ($n=3$, $R_2=CH_3$, $R_1=C_2H_5$)

A slurry of 107 parts of 96 percent sodium cyanide and 356 parts of 1-ethyl-6-methyl-2-piperidone was heated and stirred at 150° C. while 356 parts of ethyl 6-chlorohexanoate were added over a period of 35 minutes. Heating was continued for four hours to complete the reaction and the product was worked up as in Example 1. Ethyl 6-cyanohexanoate was obtained in 53 percent yield, at 92 percent efficiency.

The change in the substituent R, from methyl to ethyl, resulted in a lowering in yield and a boiling point of the solvent very close to the chloro ester, indicating a preference for the methyl substituted solvent.

EXAMPLE 4

1-Methyl-2-Pyrrolidone ($n=2$, $R_2=H$, $R_1=CH_3—$)

This is a preferred solvent. The example which follows illustrates typical reaction conditions.

A slurry of 107 parts of 96 percent sodium cyanide and 356 parts of 1-methyl-2-pyrrolidone was heated to 150° C. and stirred vigorously while 356 parts of ethyl 6-chlorohexanoate were added over a period of 40 minutes. Heating was continued one hour to complete the reaction and the product was worked up as before. Ethyl 6-cyanohexanoate was obtained in 94 percent yield and efficiency. Solvent recovery was quantitative. The cyano ester so prepared was readily hydrogenated without redistilling and the resultant amino ester was polymerized into nylon-7 resin of reduced viscosity 2.2, indicating the high purity of the nitriles produced by the process.

Subsequent experiments in producing the cyano ester showed that reaction times as short as one hour gave substantial yields, while longer reaction times were not harmful. A suitable temperature range was found to be 100° C. to 200° C.

EXAMPLE 5

2-Pyrrolidone ($n=2$, $R_1=H$, $R_2=H$)

A slurry of 107 parts of 96 percent sodium cyanide and 354 parts of 2-pyrrolidone was heated and stirred at 120° C. while 356 parts of ethyl 6-chlorohexanoate were added over a period of five minutes. The temperature was maintained at 125° C. for 20 minutes after completion of the chloro ester addition. After filtering and washing the filter cake as usual, filtrate and washings were extracted with water to remove the pyrrolidone and facilitate recovery of the product by distillation of the oil layer. A 74 percent yield of ethyl 6-cyanohexanoate was obtained, at 91 percent efficiency. Solvent recovery by distillation of the water layer was 90 percent, the balance distilling as an azeotrope with the water. However, this azeotrope, containing about 15 percent pyrrolidone, could be used instead of fresh water to dilute another run at the end of the reaction period, thus minimizing solvent loss.

EXAMPLE 6

1,3-Dimethyl-2-Imidazolidinone

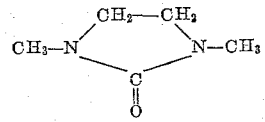

A slurry of 69 parts of 1,3-dimethyl-2-imidazolidinone and 21 parts of 96 percent sodium cyanide was heated and stirred at 145° C. while 69 parts of ethyl 6-chlorohexanoate were added over a period of 10 minutes. The mixture was held at 145° C. to 150° C., an additional four hours to complete the reaction, after which it was worked up as usual. Ethyl 6-cyanohexanoate was obtained in 89 percent yield, at 95 percent efficiency.

EXAMPLE 7

1-Propyl-6-Methyl-2-Piperidone ($n=3$, $R_2=CH_3$, $R_1=C_3H_7$)

A slurry of 94 parts of 96 percent sodium cyanide and 304 parts of 1-propyl-6-methyl-2-piperidone was heated and stirred at 145° C. while 456 parts of ethyl 6-chlorohexanoate were added over a 35-minute period. The temperature was then raised to 200° C. where it was held for four hours. Ethyl 6-cyanohexanoate was obtained in 43 percent yield and 86 percent efficiency by the usual procedure.

EXAMPLE 8

1-Methyl-2-Pyrrolidone

A slurry of 109 parts (5 percent excess) of 95 percent sodium cyanide in 356 parts of 1-methyl-2-pyrrolidone was heated and stirred at 150° C. while 356 parts of ethyl 6-chlorohexanoate were fed in over a one hour period. The temperature was held at 150° C. to 155° C. for an additional hour after the chloro ester had been fed. Ethyl 6-cyanohexanoate was obtained in 98 percent yield after recovery by the usual procedure.

A series of alkyl chlorides was reacted with sodium cyanide in 1-methyl-2-pyrrolidone under the conditions shown below. The products were identified by comparison of infrared spectra and physical properties with those of the known compounds. Isolation was as described in previous examples.

PREPARATION OF NITRILES

| Ex. No. | 1-Methyl-2-pyrrolidone, pts. | Sodium Cyanide, pts. | Chloride and pts. | Time, hrs. | Temp., °C. | Product | Yield, percent |
|---|---|---|---|---|---|---|---|
| 9 | 400 | 109 | sec.-Amyl, 210 | 10.5 | 120-140 | 2-Methylvaleronitrile | 57 |
| 10 | 250 | 93 | 2-Ethylhexyl 250 | 3.0 | 148-155 | 2-Ethylheptanonitrile | 80 |
| 11 | 100 | 37 | 1-Methylheptyl 100 | 4.25 | 145-150 | 2-Methylcaprylonitrile | 32 |
| 12 | 282 | 217 | 1,5-Dichloropentane, 282 | 2.0 | 145-150 | Pimelonitrile | 90 |
| 13 | 318 | 271 | 1,4-Dichlorobutane, 318 | 2.0 | 145-155 | Adiponitrile | 92 |

What is claimed is:

1. In the method for the production of an aliphatic nitrile by reacting an alkali metal cyanide with a halogen substituted aliphatic compound, wherein at least one halogen of atomic weight greater than 35 is linked to a non-tertiary carbon atom, the improvement of conducting the reaction in a solvent selected from the group consisting of 1-acetylmorpholine, 1,3-dimethyl-2-imidazolidinone, and compounds of the general formula:

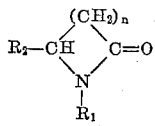

wherein $n$ represents an integer having a value of 2 to 3 and $R_1$ and $R_2$ represent members of the group consisting of hydrogen, methyl, ethyl, isopropyl and propyl.

2. The method of claim 1 wherein the solvent is 1-methyl-2-pyrrolidone.
3. The method of claim 1 wherein the halogen substituted aliphatic compound is a lower alkyl ester of 6-chlorohexanoic acid.
4. The method of claim 1 wherein the halogen substituted aliphatic compound is ethyl-6-chlorohexanoate.
5. The method of claim 1 wherein the halogen substituted aliphatic compound is an alkyl chloride.
6. The method of claim 1 wherein the halogen substituted aliphatic compound is 1,4-dichlorobutane.
7. The method of preparing lower alkyl esters of 6-cyanohexanoic acid comprising reacting an alkali metal cyanide with a lower alkyl ester of 6-chlorohexanoic acid, at a temperature of from 100° C. to 200° C. in 1-methyl-2-pyrrolidone.
8. The method of claim 7 wherein the lower alkyl ester of 6-chlorohexanoic acid is ethyl-6-chlorohexanoate.
9. The method of claim 1 wherein the solvent is 1-acetylmorpholine.
10. The method of claim 1 wherein the solvent is 1,3-dimethyl-2-imidazolidinone.

References Cited in the file of this patent

UNITED STATES PATENTS 2,715,137     Copelin _____ Aug. 9, 1955

OTHER REFERENCES

Degering: "An Outline of Organic Nitrogen Compounds," 1945, page 701 (section 2237).